United States Patent [19]

Thorner et al.

[11] Patent Number: 5,684,722

[45] Date of Patent: Nov. 4, 1997

[54] APPARATUS AND METHOD FOR GENERATING A CONTROL SIGNAL FOR A TACTILE SENSATION GENERATOR

[76] Inventors: Craig Thorner, 16 Nantucket Ct., Howell, N.J. 07731; Thomas K. Glass, 277 Frank Applegate Rd., Jackson, N.J. 08527

[21] Appl. No.: 309,763

[22] Filed: Sep. 21, 1994

[51] Int. Cl.$^6$ ................................................ G06F 17/00
[52] U.S. Cl. ............................................................ 364/578
[58] Field of Search ................................ 364/578, 514, 364/DIG. 1, DIG. 2; 360/14.2; 340/712; 345/156; 84/645, 610, 464 R, 601, 602, 609, 611, 634, 635, 641, 642, DIG. 1, DIG. 2, DIG. 29; 395/152, 153, 154, 155

[56] References Cited

U.S. PATENT DOCUMENTS

| | | | |
|---|---|---|---|
| 1,738,289 | 12/1929 | Fletcher | 463/30 |
| 4,081,829 | 3/1978 | Brown | 358/82 |
| 4,257,062 | 3/1981 | Meredith | 358/81 |
| 4,310,315 | 1/1982 | Frank et al. | 434/114 |
| 4,581,491 | 4/1986 | Booothroyd | 434/114 |
| 4,771,344 | 9/1988 | Fallacaro et al. | 358/335 |
| 4,988,981 | 1/1991 | Zimmerman et al. | 340/709 |
| 5,307,456 | 4/1994 | MacKay | 395/154 |
| 5,374,924 | 12/1994 | McKiel, Jr. | 463/30 |
| 5,388,992 | 2/1995 | Franklin et al. | 434/114 |
| 5,513,129 | 4/1996 | Bolas et al. | 364/578 |
| 5,513,130 | 4/1996 | Redmond | 364/578 |

Primary Examiner—Ellis B. Ramirez
Attorney, Agent, or Firm—Thomason & Moser

[57] ABSTRACT

A control system that is responsive to an audio signal generated by an audio source such as a computer, video game console, stereo system and the like. The control system converts the audio signal into a control signal for a tactile sensation generator such as a vibrating cushion, vibrating seat pad, and the like. The control system contains an audio signal processor and a control signal generator. The audio signal processor produces a processed signal indicative of the amplitude, frequency, and rate of change of the audio signal. From the processed signal, a control signal generator produces a control signal for a tactile sensation generator. The control signal causes the tactile sensation generator to produce a tactile sensation corresponding to the present scene being displayed, for example, on a monitor of a computer executing a computer game.

27 Claims, 4 Drawing Sheets

APPARATUS AND METHOD FOR GENERATING A CONTROL SIGNAL FOR A TACTILE SENSATION GENERATOR

BACKGROUND OF THE DISCLOSURE

1. Field of the Invention

The invention relates to virtual reality computer systems and, more particularly, to circuitry for converting an audio signal into a control signal for a tactile sensation generator within a virtual reality computer system.

2. Description of the Prior Art

Video games are typically executed by microprocessors within dedicated game consoles or computers such that a player interactively manipulates a video game scene as displayed on a video monitor or television using a keyboard, mouse, joystick, or some other command input device. In addition to the video output, most game apparatus also produces an audio output that corresponds to the scene presently displayed on the monitor. In this manner, the game apparatus exposes a player is exposed to both auditory and visual sensation.

Although today's audio-visual game experience is exciting, the excitement is limited by the game's inability to produce any form of tactile sensation corresponding to the scene being displayed. Generally, tactile sensation, such as vibration, fist and bullet strikes and the like, have not been simulated with any great success. In one available tactile sensation generator, a modified speaker is positioned below a player's seat such that low frequencies in the sound applied to the modified speaker will vibrate the seat. In such a system, the sound volume must be very loud to achieve the sensation of vibration.

Therefore, a need exists in the art for circuitry that processes an audio signal produced by a video game program or other audio source and generates, in response to the audio signal, control signals to activate a tactile sensation generator.

SUMMARY OF THE INVENTION

The present invention overcomes the disadvantages of the prior art by providing apparatus, and a concomitant method, of generating, from an audio signal, a control signal for a tactile sensation generator. Specifically, the invention is a control system that is responsive to an audio signal generated by an audio source such as a computer, video game console, stereo system, microphone and the like. The control system converts the audio signal into a control signal for a tactile sensation generator such as a vibrating cushion, vibrating seat pad, and the like. The control system contains an audio signal processor and a control signal generator. The audio signal processor produces a processed signal indicative of the amplitude, frequency, and rate of change of the audio signal. From the processed signal, a control signal generator produces a control signal for a tactile sensation generator. The control signal causes the tactile sensation generator to produce a tactile sensation corresponding to the present scene being displayed, for example, on a monitor of a computer executing a computer game program.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
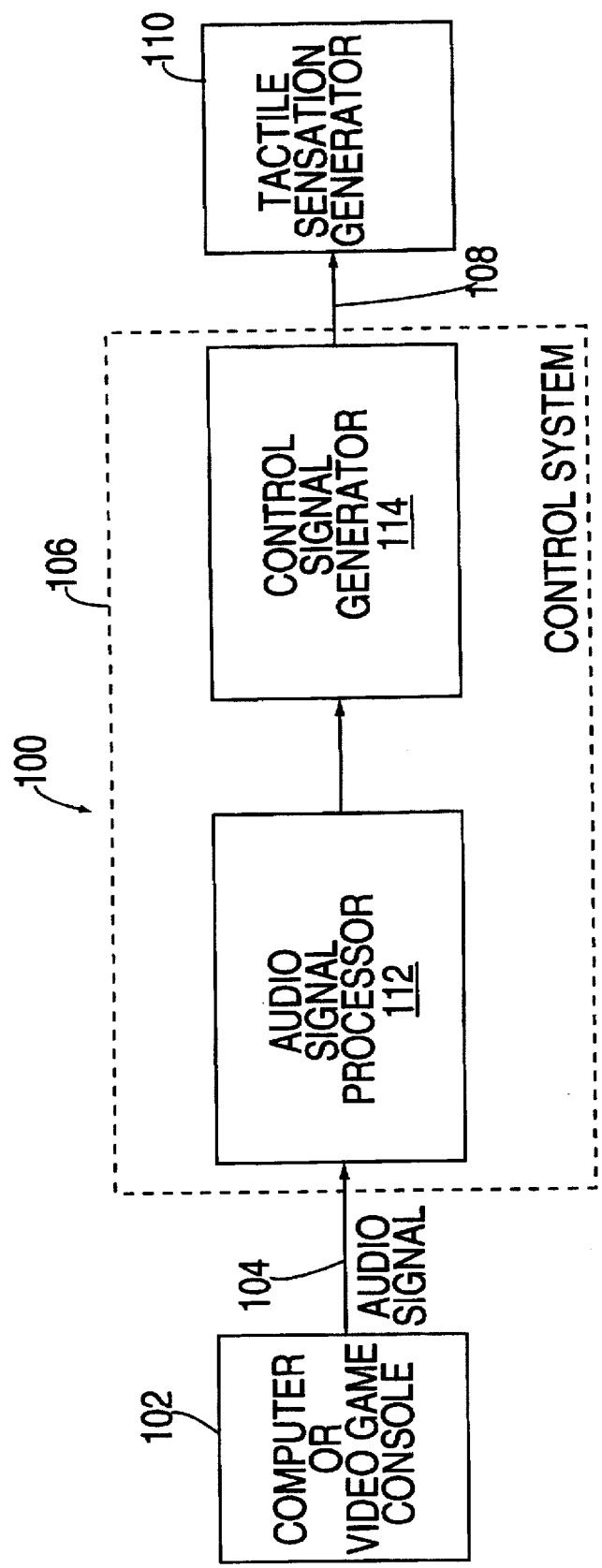
FIG. 1 depicts a high level block diagram of a tactile sensation generation system.

FIG. 1 depicts a high level block diagram of a tactile sensation generation system 100 containing a computer system or video game console 102, a tactile sensation generator 110 and a control system 106 for the tactile sensation generator 110. The control system 106 further contains an audio signal processor 112 and a control signal generator 114. The home computer 102 may, of course, be replaced with any device that produces an audio signal such as a video game console, stereo system, television receiver, microphone, and the like. However, for simplicity, throughout this disclosure, it is assumed that the audio source is a conventional home computer executing a video game program. As such, the control system 106 converts the audio signals conventionally generated by the video game into control signals for the tactile sensation generator.

More specifically, the computer 102 has its audio output port, e.g., an earphone jack, connected, via line 104, to audio signal processor 112 within the control system 106. In general, the signal processor analyzes the frequency, amplitude, and rate of change of the audio signal produced by the currently executing video game. From the analysis of the audio signal, the audio signal processor 112 produces a processed signal. The processed signal forms an input to the control signal generator 114 which produces a control signal, on line 108, for the tactile sensation generator 110.

The tactile sensation generator can be one or more devices (actuators) capable of simulating vibration, punches, bullet strikes and the like in accordance with specific control signals. Consequently, while using the inventive apparatus, a player experiences a virtual reality while interacting with the video game. To provide a full understanding of the invention, a detailed example of a tactile sensation generator is provided below.

Figure 2:
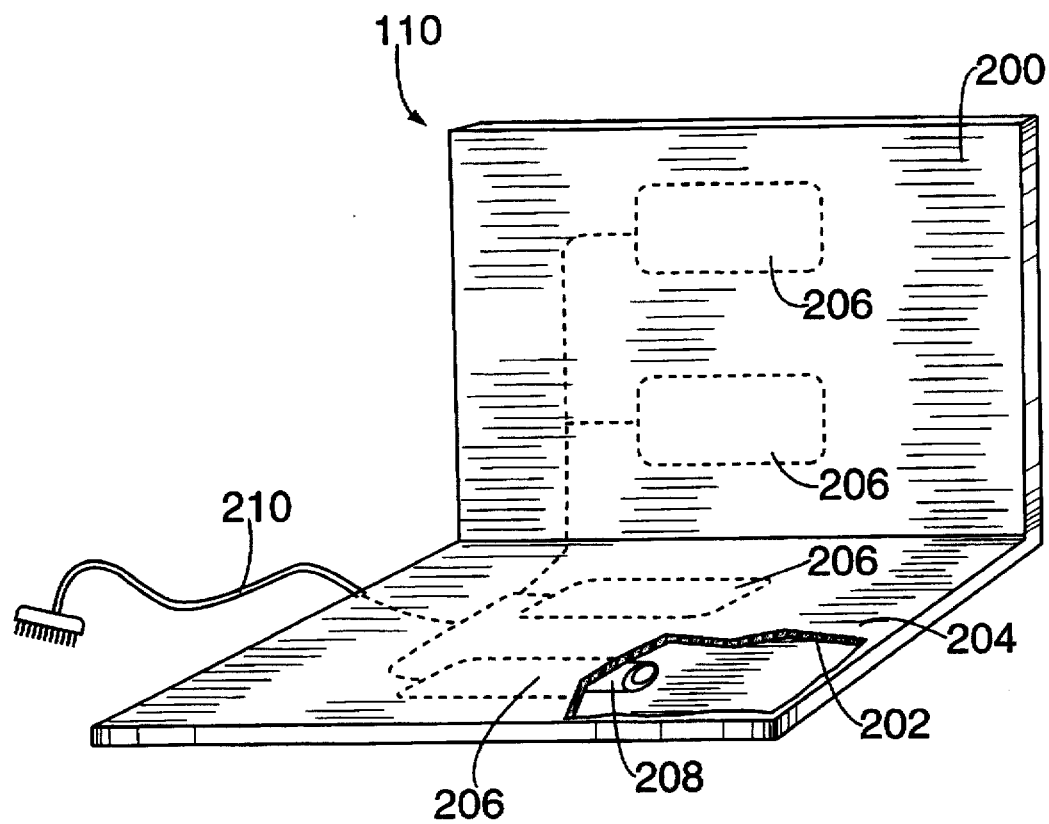
FIG. 2 schematically depicts an illustrative tactile sensation generator.

FIG. 2 depicts one example of a tactile sensation generator 110 capable of being controlled by the control system 106. Specifically, the tactile sensation generator contains a seat pad 200 having localized vibration producing actuators 206 distributed within the pad. The seat pad 200 is a foam cushion 202 enclosed in a cloth cover layer 204. Beneath the cover layer 204 are electric motors having offset weights mounted to their shafts. One such motor 208 is depicted in FIG. 2. When activated by control signals applied via wires 210, the shafts of the motors rotate and the offset weights cause the motors to vibrate. The depicted seat has four such vibrating motors. A seat pad of this type is available as model 905 from JB Research of Los Angeles, Calif. Although tactile sensation is generated in this example by vibrating electric motors, those skilled in the art will realize that any type of vibrating actuator may be used in lieu of motors including buzzers, solenoids, piezo-electric actuators, and the like. Also, any number of actuators can be used, i.e., one or more actuators. Furthermore, the tactile sensation actuators do not have to be vibratory. It is foreseeable that other forms of generators such as solenoids could be used to poke and prod a player with a single strike when a bullet or fist impact is to be simulated.

Using the seat pad described above, a video game such as an auto racing game produces simulated vibration as a player's video game car accelerates, e.g., increased vibration with engine revs (higher pitched sound). The amplitude and frequency of the vibration is changed as the video car changes speed. Also, impacts with obstacles that are evidenced by low frequency, high amplitude audio signals result in forceful, high-frequency vibrations throughout the seat pad. Consequently, while playing the video game, a player receives a tactile sensation of actually sitting in a race car. To enhance the virtual reality effect, vibrating wrist and/or ankle tactile sensation generators can be applied to the player in addition to the seat pad. In accordance with the teachings of the present invention, the control system 106 produces control signals for the vibration actuators 206.

Figure 3:
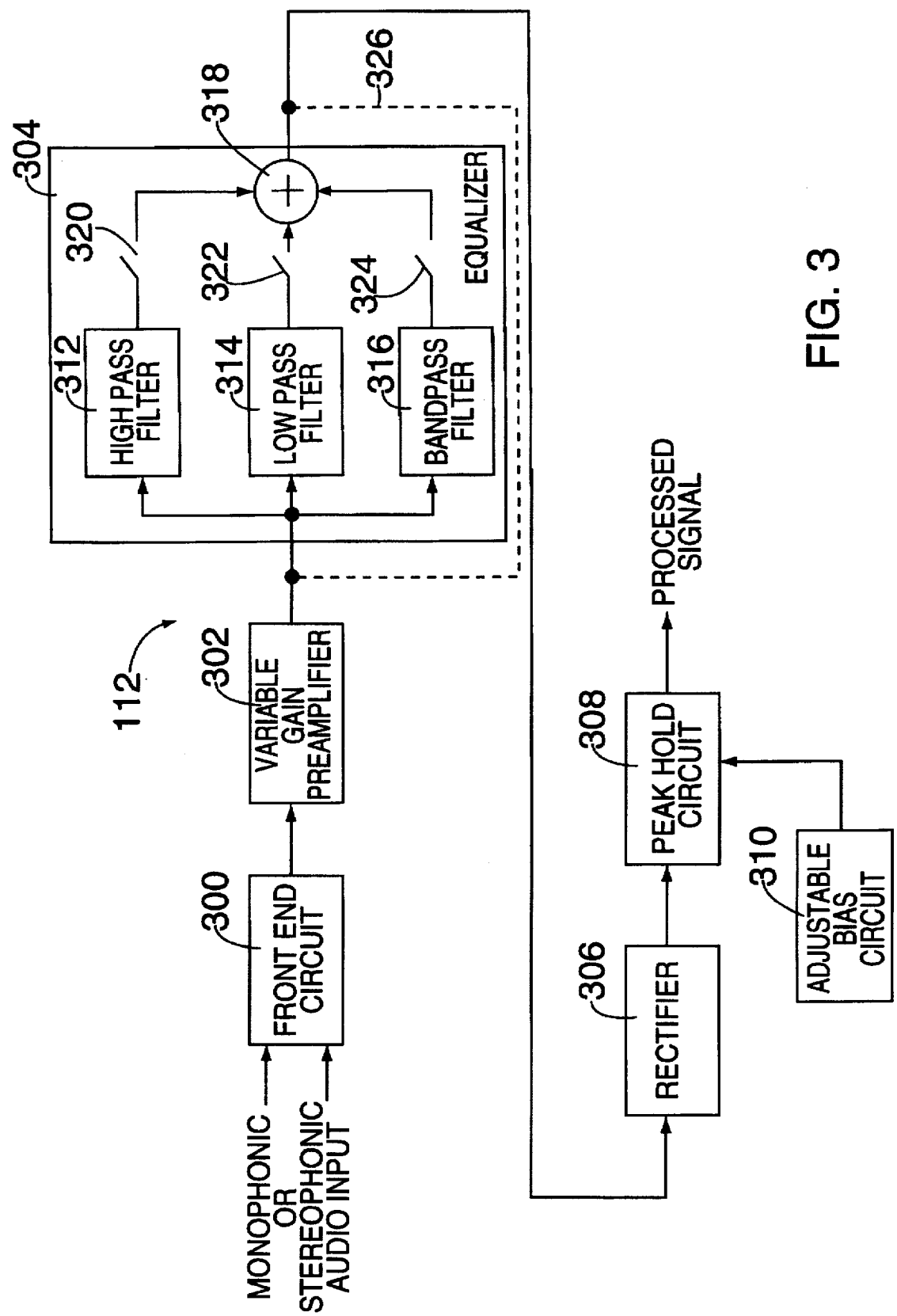
FIG. 3 depicts a detailed block diagram of the audio signal processor of FIG. 1.

FIG. 3 depicts a detailed block diagram of the audio signal processor 112. In general, the input to processor 112 is an audio signal from an audio source, any audio source. The signal may be either stereophonic or monophonic. The processor 112 responds to the pitch (frequency), volume (amplitude) and rate of change of the audio signal by producing a processed signal indicative of these characteristics of the input audio signal.

Specifically, the audio signal processor 112 contains a front end circuit 300, a preamplifier 302, an equalizer 304, a rectifier 306, a peak hold circuit 308, and an adjustable bias circuit 310. These major components are more or less connected in series.

More specifically, the front end circuit 300 contains a mixer for combining both channels of a stereophonic audio signal to form a composite audio signal, a high pass filter for limiting noise that is below of the audio band, e.g., lower than 20 Hz, and a diode signal limiter for limiting (clipping) the amplitude of the input signal to protect the audio signal processor from being damaged by overly powerful input audio signals. Circuitry 300 is connected to a variable gain preamplifier 302.

The variable gain preamplifier 302 establishes the dynamic range of the entire audio signal processor 112. For instance, if the gain of the preamplifier is set to high, any loud (high amplitude) signals would saturate the processor and, as such, not create the desired tactile sensation. On the other hand, if the preamplifier gain is set too low, low amplitude audio signals would not generate any tactile sensation and only high amplitude signals would cause a tactile response. Consequently, a player must adjust the gain of the preamplifier to conform to audio signal levels generated by the game currently being played. In other words, the specific gain setting depends upon the dynamic range of input audio signal and the player's tactile sensation preferences. Illustratively, the voltage gain of the preamplifier is variable from no gain to a 1000 times. In some applications where the audio signal has a low amplitude, additional fixed gain amplification may be necessary before and/or after the variable gain preamplifier.

Once amplified, the audio signal forms an input to the equalizer 309. The equalizer contains three parallel connected filters: a high pass filter 312, a low pass filter 314, and an bandpass filter 316. The high pass filter has an illustrative passband of 2 kHz to 13 kHz, the low pass filter has an illustrative passband of 28 Hz to 350 Hz, and the bandpass filter has a passband of 230 Hz to 10.3 kHz. The three paths each form an input to a summing amplifier 318. Additionally, each of the three paths has a switch (switches 320, 322, and 324) to select one or more of the paths as an input to the summing amplifier 318. As such, depending on which of the signal paths are connected to the summing amplifier, the equalizer can selectively amplify or attenuate low frequencies, high frequencies or both. As such, a game player can adjust the frequency content of the audio that is used to generate tactile sensation generator control signals and, consequently, tailor the tactile sensation to the game being executed.

Nonetheless, the equalizer 304 is an optional circuit for the invention. The equalizer permits optimizing the tactile sensation to a audio source, e.g., the equalizer enables a video game player to exclude the background music of the game from the audio signal that produces a tactile sensation. Therefore, if such additional flexibility is not desired, the equalizer can be deleted.

The rectifier 306 is provided to produce a positive signal from the bi-polar filtered audio signal. The peak hold circuit 308 responds quickly to the peak amplitude of the rectified signal, but slowly decays from that peak amplitude. Specifically, the peak hold circuit contains a parallel combination of a capacitor and a resistor. The capacitor charges as the rectified audio signal is applied thereacross. The resistor has a very large resistance, e.g., 10M$\Omega$, such that the capacitor (0.022 $\mu$F) discharges slowly through the resistance. As a result, the capacitor temporarily holds the peak amplitude of the rectified audio. The voltage level on the capacitor forms an input to a high impedance voltage amplifier. This implementation of the peak circuit samples both the frequency and amplitude of the rectified audio signal, i.e., when either the frequency or amplitude of the input signal change, the output signal will change to some degree. As such, the output of the peak hold circuit contains information pertaining to the frequency and amplitude of the rectified signal.

The specific time constant of this RC circuit is defined by the response time of the actuators used in the tactile sensation generator. For example, the response of electric motors is rather slow; therefore, the resonant frequency of the RC circuit would be approximately 90 Hz. In contrast, if the actuators in the tactile sensation generator are piezo-electric actuators; then, the resonant frequency of the RC circuit would be on the order of a thousand hertz or more.

Also, a DC bias voltage, generated by adjustable bias circuit 310, is added to the peak held signal such that the amplifier output signal is a composite (sum) of the peak held signal and the DC bias value. The bias value is a player adjustable offset. The utility of this DC bias is discussed below. The biased and amplified peak held signal is hereinafter referred to as a processed signal.

Figure 4:
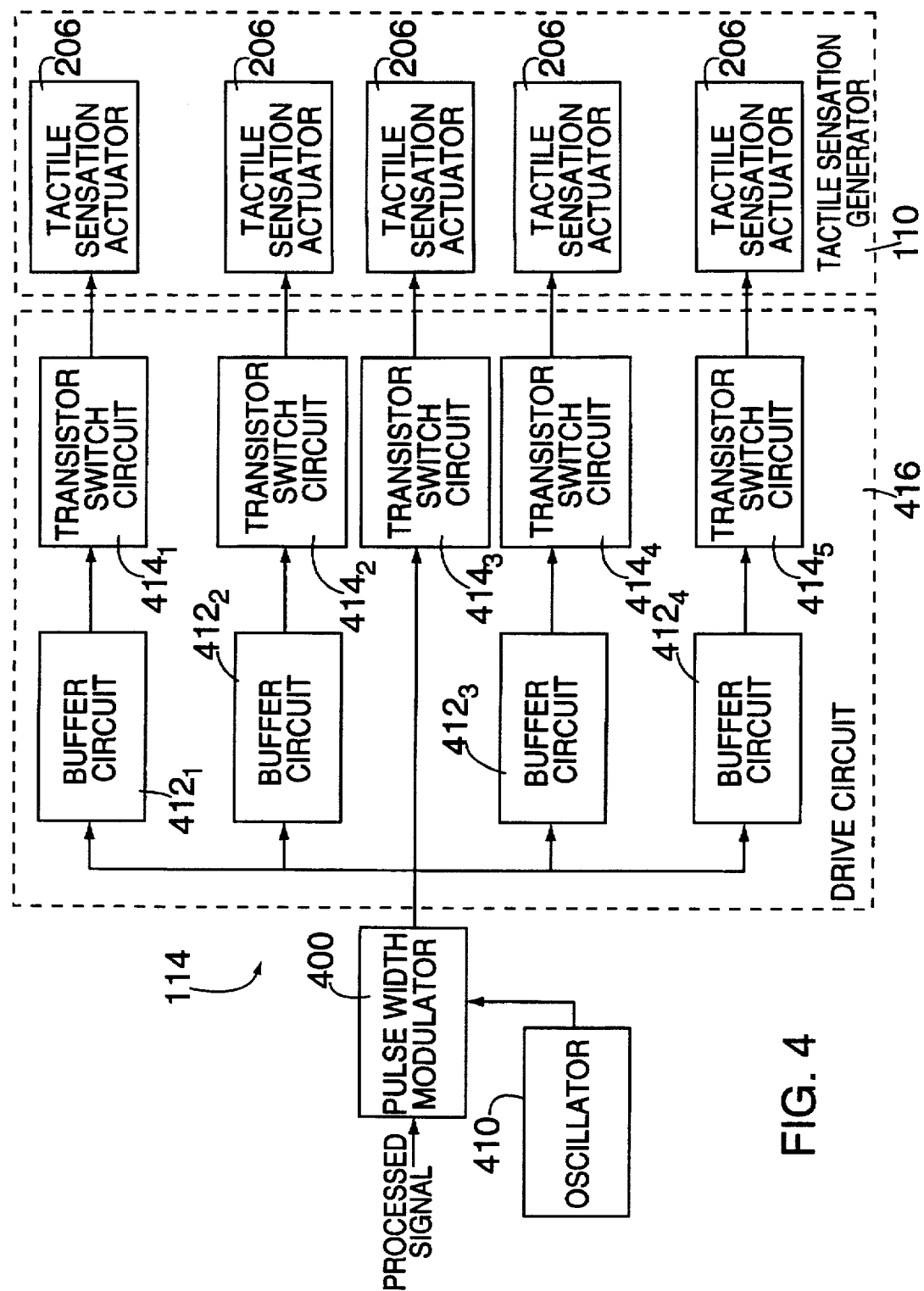
FIG. 4 depicts a detailed block diagram of the control signal generator of FIG. 1.

FIG. 4 depicts a detailed block diagram of the control signal generator 114. Specifically, the control signal generator contains a pulse width modulator 400, an oscillator 410, and drive circuit 416 for the tactile sensation generator 110. The processed signal forms an input to the pulse width modulator 400, e.g., a conventional 555 timer. Those skilled in the art will realize from this disclosure that other forms of modulation such as frequency modulation are also useful in lieu of pulse width modulation.

The pulse width modulator generates a pulse having a width that corresponds to the amplitude of the input signal to the pulse width modulator. As such, if a constant DC voltage level (e.g., the DC bias discussed above) forms an input to the pulse width modulator, the modulator will generate an output pulse having a pulse width indicative of the amplitude of that DC signal. When an AC signal forms the input to the modulator (e.g., the processed signal), each output pulse from the modulator has a duration that is indicative of the instantaneous amplitude of the AC signal sampled at the clock rate. As such, for each clock pulse, the pulse width modulator generates an output pulse having a width defined by the amplitude of the processed signal at the moment the clock pulse occurs. The pulse width of the output pulse defines the activation duration for an actuator 206 in the tactile sensation generator 110, e.g., the longer the pulse width the longer the vibration time.

The oscillator 410 generates a clock signal for the pulse width modulator 400. Typically, the clock signal has a fixed, nominal pulse rage that is slightly longer than the maximum possible duration of an output pulse of the pulse width modulator. The clock rate is optionally adjustable from the minimum clock pulse spacing (e.g., slightly longer than the maximum possible duration of the modulator output pulse). By increasing the spacing between the clock pulses and having a fixed maximum duration for the output pulse of the modulator, the effective duty cycle of the pulse width modulator output pulse is reduced. For example, if the clock pulse spacing is doubled from its minimum rate and the modulator is currently producing maximum width pulses, the duty cycle is effectively halved by the clock pulse spacing increase, i.e., the output pulse of the modulator is generated for half the time between the clock pulses. In this manner, a player may adjust the intensity of the vibration to a comfortable level.

The output signal from the pulse width modulator 400 is used by the drive circuit 416 to turn on and off one or more actuators 206 in the tactile sensation generator 110. The drive circuit contains at least one transistor switch circuit $414_3$. The transistor switch circuit $414_3$, in response to the output pulse of the modulator 400 becomes activated, e.g., conducts current, such that the transistor circuit, once activated, allows current to pass through an actuator 206 to ground. In response, the actuator 206, e.g., a DC motor, vibrates. A pulse width modulator, such as the 555 timer, is generally capable of driving a single transistor to activate a single actuator. To enable the pulse width modulator to drive multiple transistor circuits $414_1$ through $414_5$ and multiple actuators 206, one or more buffer circuits $412_1$ through $412_4$ are typically provided between the transistor circuits and the pulse width modulator.

The drive circuit 416 causes the tactile sensation actuators 206 to generate a tactile sensation for the player in response to audio signals presently being generated by the video game. By adjusting the filtering of the equalizer, the preamplifier gain, and the oscillator clock rate, the player can tailor the responsiveness of the control system to any particular game or other audio source. In addition, by adjusting the DC bias, the player can generate constant background (i.e., low amplitude) tactile sensation such as constant vibration of a race car while idling. As such, the present invention provides superb virtual reality excitement for a video game player.

The foregoing disclosure focused upon the use of the invention to provide a virtual reality experience to a video game player. However, this is not the only application for the invention. For example, it is foreseeable that the invention could be used to provide therapeutic tactile sensations to injured persons, e.g., vibrating certain muscles during physical therapy. Also, the invention can be used as a device for the hearing impaired, e.g., as a warning device that provides a tactile sensation when a certain sound occurs nearby such as a car horn, warning sound, and the like. Furthermore, the invention could be used in conjunction with a voice analyzer to provide a hearing impaired person with a tactile sensation in response to certain spoken words.

Although various embodiments which incorporate the teachings of the present invention have been shown and described in detail herein, those skilled in the art can readily devise many other varied embodiments that still incorporate these teachings.

What is claimed is:

1. Apparatus for generating a control signal for a tactile sensation generator comprising:
   an audio signal processor for processing audio signals and generating a processed signal; and
   a control signal generator, connected to said audio signal processor, for generating, in response to said processed signal, said control signal for controlling the tactile sensation generator.

2. The apparatus of claim 1 wherein said audio signal processor generates said processed signal in response to the frequency, amplitude and rate of change of said audio signal.

3. The apparatus of claim 2 wherein said audio signal processor further comprises an equalizer for selectively amplifying or attenuating selected frequency bands of said audio signal.

4. The apparatus of claim 3 wherein said equalizer further comprises a high pass filter, a low pass filter and a bandpass filter connected in parallel and having an output port of the high pass filter, the low pass filter and the bandpass filter connected to three respective inputs of a summing amplifier.

5. The apparatus of claim 1 wherein said signal processor further comprises a rectifier for rectifying said audio signal.

6. The apparatus of claim 5 wherein said signal processor further comprises a peak hold circuit for temporarily holding the peak amplitude of the rectified audio signal.

7. The apparatus of claim 6 wherein said peak hold circuit further comprises DC bias circuitry for applying a DC bias to the peak amplitude of the rectified audio signal.

8. The apparatus of claim 7 wherein said control signal generator further comprises a pulse width modulator for producing a control signal having a pulse width indicative of the amplitude of the sum of the DC bias and the peak amplitude of the rectified audio signal.

9. The apparatus of claim 8 wherein the pulse width of said control signal determines the on time for a tactile sensation generator.

10. The apparatus of claim 1 wherein said tactile sensation generator vibrates in response to said control signal.

11. The apparatus of claim 10 wherein said tactile sensation generator is a dc motor having an offset weight connected to a shaft such that, when energized by the control signal, the motor vibrates.

12. The apparatus of claim 1 wherein said audio signal is produced by a video game executing upon a microprocessor.

13. The apparatus of claim 1 further comprising an oscillator for generating timing signals for the control signal generator.

14. The apparatus of claim 13 wherein said oscillator has a variable frequency.

15. Apparatus for generating a control signal for a tactile sensation generator comprising:
   a front end circuit for forming a composite audio signal from a stereophonic audio signal;
   a variable gain preamplifier, connected to said front end circuit, for amplifying said composite audio signal;
   an equalizer, connected to said preamplifier, for selectively filtering said amplified composite audio signal;
   a rectifier, connected to said equalizer, for rectifying the equalized signal;
   a peak hold circuit, connected to said rectifier, for temporarily holding the rectified signal and for adding a DC bias to the rectified signal to generate a processed signal; and a control signal generator, connected to said peak hold circuit, for generating, in response to said processed signal, a control signal for said tactile sensation generator.

16. The apparatus of claim 15 wherein said control signal generator further comprises a pulse width modulator for generating a control signal having at least one pulse whose pulse width is indicative of the amplitude of the processed signal.

17. The apparatus of claim 16 wherein said control signal generator further comprises an oscillator for producing a variable clock rate for said pulse width modulator to adjust a duty cycle of said control signal.

18. A method of generating a control signal for a tactile sensation generator comprising the steps of:

processing an audio signal to generate a processed signal; and generating, in response to said processed signal, said control signal for said tactile sensation generator.

19. The method of claim 18 wherein said audio signal processing step further comprises the step of generating said processed signal in response to the frequency, amplitude and rate of change of said audio signal.

20. The method of claim 18 wherein said audio signal processing step further comprises the step of equalizing said audio signal by selectively amplifying or attenuating selected frequency bands of said audio signal.

21. The method of claim 18 wherein said audio signal processing step further comprises the step of rectifying said audio signal.

22. The method of claim 21 wherein said audio signal processing step further comprises the step of temporarily holding a peak amplitude of the rectified audio signal.

23. The method of claim 22 wherein said holding step further comprises applying a DC bias to the peak amplitude of the rectified audio signal.

24. The method of claim 23 wherein said control signal generating step further comprises the step of producing a control signal having a pulse width indicative of the amplitude of the sum of the DC bias and the peak amplitude of the rectified audio signal.

25. The method of claim 18 wherein said tactile sensation generator vibrates in response to said control signal.

26. A method of generating a control signal for a tactile sensation generator comprising the steps of:

forming a composite audio signal from a stereophonic audio signal;

amplifying said composite audio signal;

selectively filtering said amplified composite audio signal;

rectifying the equalized signal;

temporarily holding the rectified signal and for adding a DC bias to the rectified signal to generate a processed signal; and generating, in response to said processed signal, a control signal for said tactile sensation generator.

27. The method of claim 26 wherein said control signal generating step further comprises the step of generating a control signal having at least one pulse whose pulse width is indicative of the amplitude of the processed signal.

* * * * *